United States Patent
Gambon et al.

(10) Patent No.: US 11,651,404 B2
(45) Date of Patent: May 16, 2023

(54) VIRTUAL SHOPPING ASSISTANT

(71) Applicant: KYNDRYL, INC., New York, NY (US)

(72) Inventors: Kenneth Gambon, Erie, CO (US); Hasibe Göçülü, Selcuklu (TR); Saravanan Shanmugam, Chennai (IN)

(73) Assignee: KYNDRYL, INC., New York, NY (US)

(*) Notice: Subject to any disclaimer, the term of this patent is extended or adjusted under 35 U.S.C. 154(b) by 92 days.

(21) Appl. No.: 17/462,129

(22) Filed: Aug. 31, 2021

(65) Prior Publication Data
US 2023/0066957 A1 Mar. 2, 2023

(51) Int. Cl.
*G06Q 30/06* (2023.01)
*G06Q 30/0601* (2023.01)
(Continued)

(52) U.S. Cl.
CPC ......... *G06Q 30/0619* (2013.01); *G06Q 20/12* (2013.01); *G06Q 30/04* (2013.01);
(Continued)

(58) Field of Classification Search
CPC ........... G06Q 30/0619; G06Q 30/0635; G06Q 30/04; G06Q 20/12; G05B 2219/50391; G06F 21/31
(Continued)

(56) References Cited

U.S. PATENT DOCUMENTS 9,311,527 B1 4/2016 Yin
10,180,683 B1* 1/2019 Libman ................ G05D 1/0246
(Continued)

FOREIGN PATENT DOCUMENTS

KR 101709683 B1 2/2017
KR 20170047195 A 5/2017
(Continued)

OTHER PUBLICATIONS

Gharpure, Chaitanya P; "Design, implementation and evaluation of interfaces to haptic and locomotor spaces in robot-assisted shopping for the visually impaired", published Theses ProQuest Dissertations Publishing. (2008); retrieved from Dialog database online on Jan. 17, 2023 (Year: 2008).*

(Continued)

*Primary Examiner* — Yogesh C Garg
(74) *Attorney, Agent, or Firm* — Dan Housley; Andrew M. Calderon; Calderon Safran & Cole P.C.

(57) ABSTRACT

In an approach to provide contact-less shopping assistance to a user, a computer implements a method for receiving customer authentication data from a user and associating the customer authentication data with a tagged wearable device and a tagged mobility device with the user. The method further includes receiving an indication the user is wearing the tagged mobility device, and that the user is entering a shopping facility using the tagged mobility device. The method further includes receiving a user instruction to capture an image causing the tagged wearable device to capture the image, identifying a bar code in the image, determining an item based on the bar code and transmitting an action instruction to the tagged mobility device to retrieve the item and secure the item. The method further includes receiving an indication that the user has completed the task and delivering the item to the user.

20 Claims, 6 Drawing Sheets

(51) Int. Cl.
*G06Q 20/12* (2012.01)
*G06Q 30/04* (2012.01)
*G06K 7/14* (2006.01)
*G06F 21/31* (2013.01)

(52) U.S. Cl.
CPC ............... *G06Q 30/0635* (2013.01); *G05B 2219/50391* (2013.01); *G06F 21/31* (2013.01); *G06K 7/1413* (2013.01); *G06K 7/1447* (2013.01)

(58) Field of Classification Search
USPC ..................................................... 705/26.44
See application file for complete search history.

(56) References Cited

U.S. PATENT DOCUMENTS

| 11,250,495 | B1* | 2/2022 | Bowman | G06Q 30/0223 |
| 2018/0091939 | A1* | 3/2018 | Venkatraman | H04W 4/021 |
| 2018/0341908 | A1 | 11/2018 | Lert, Jr. | |
| 2020/0076998 | A1 | 3/2020 | Gusstafsson | |
| 2021/0089040 | A1* | 3/2021 | Ebrahimi Afrouzi | G05D 1/0248 |
| 2022/0172202 | A1* | 6/2022 | Wedmore | G07F 17/12 |

FOREIGN PATENT DOCUMENTS

| KR | 20180037150 A | 4/2018 | |
| WO | 2019242694 A1 | 12/2019 | |
| WO | WO-2021216425 A1 * | 10/2021 | G06Q 30/0601 |

OTHER PUBLICATIONS

Metrology News, "Eye Tracking Software Could Improve Collaborative Robot Human Interaction", Metrology News E-Zine, May 4, 2020, 7 Pages.
Tobii Pro, "How eye tracking enhances shopper research", Tobii Pro, Accessed on Apr. 22, 2021, 5 Pages.
Zientara et al., "Third Eye: A Shopping Assistant for the Visually Impaired", Computer, vol. 50, No. 02, Feb. 2017, 9 Pages.
Mell et al., "The NIST Definition of Cloud Computing", National Institute of Standards and Technology, Special Publication 800-145, Sep. 2011, 7 pages.

* cited by examiner

VIRTUAL SHOPPING ASSISTANT

BACKGROUND

The present invention relates generally to the field of assistive shopping devices and programs, and more particularly to virtual assisted item selection.

Users utilize a variety of different shopping methods, including for some, visiting a store in-person, and for others, use of a shopping software application to create a list. A shopping software application allows users to shop without entering a physical store, however, users do not have a view to the items in the store and only add a product and quantity for another person to select. The user does not have visibility to the quality of the product.

SUMMARY

Embodiments of the present invention disclose a method, a computer program product, and a system for providing virtual shopping assistance to a user. The method includes receiving customer authentication data from a user and associating the customer authentication data with a tagged wearable device and a tagged mobility device with the user. The method further includes receiving an indication the user is wearing the tagged mobility device, and that the user is entering a shopping facility using the tagged mobility device. The method further includes receiving a user instruction to capture an image causing the tagged wearable device to capture the image, identifying a bar code in the image, determining an item based on the bar code and transmitting an action instruction to the tagged mobility device to retrieve the item and secure the item. The method further includes receiving an indication that the user has completed the task.

DETAILED DESCRIPTION

Embodiments of the present invention recognize that shoppers are realizing a greater need for mobility and assisted living, especially during global pandemics when staying at home decreases a person's chance of contracting a respiratory disease. Countless personalized shopping services, home delivery services, and touchless shopping services have emerged during the COVID-19 pandemic to facilitate consumer safety while maintaining some semblance of normalcy throughout the global economy. Public health organizations and other government agencies have urged shoppers to stay at home unless necessary and recommending safety precautions while navigating our cities and towns in public spaces. Shoppers are encouraged to socially distance and wash and/or sanitize hands and surfaces often to avoid touching surfaces that may have been infected with a communicable disease.

Embodiments of the present invention recognize that shoppers would benefit from an automatic assistive shopping (AAS) device that receives instructions and commands from a user to navigate shopping spaces, identify items, provide information about items, retrieve a targeted item, and pay for the retrieved item, all while avoiding personal contact with items or surfaces in the shopping space. In some embodiments, a user may be equipped with an augmented reality (AR) device (e.g., virtual goggles) that is associated with the AAS device to navigate the shopping space via a user interface of the AR device. Further, the AR device may be configured to detect a user action instructing the AR device or the AAS device to perform a function to assist the user. Furthermore, the AAS device may be provided to the user to facilitate user mobility throughout the shopping space.

Embodiments of the present invention recognize that the AAS device would further assist the user by receiving instructions from the user to retrieve an item identified by the user in the shopping space. For example, the AAS device may include a robotic arm configured to retrieve items identified by the user via the AR device.

Embodiments of the present invention recognize that the AAS device and the AR device could be remotely controlled by the user to carry out the shopping activity described above herein.

The present invention will now be described in detail with reference to the Figures.

Figure 1:
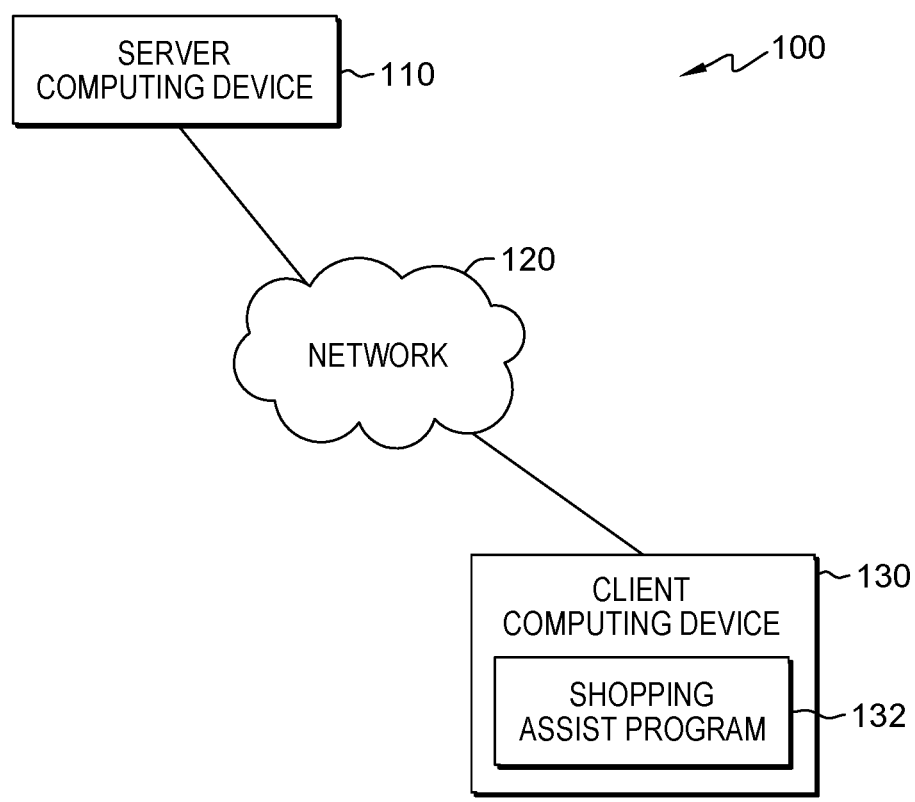
FIG. 1 is a functional block diagram illustrating a distributed data processing environment, in accordance with an embodiment of the present invention.

FIG. 1 is a functional block diagram illustrating a data processing environment, generally designated 100, in accordance with one embodiment of the present invention. In an embodiment, data processing environment 100 may be a distributed data processing environment. The term "distributed" can describe a computer system that includes multiple, physically distinct devices that operate together as a single computer system. FIG. 1 provides only an illustration of one implementation and does not imply any limitations with regard to the environments in which different embodiments may be made by those skilled in the art without departing from the scope of the invention as recited by the claims.

Data processing environment 100 includes server computing device 110 and client computing device 130, interconnected via network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks capable of receiving and transmitting data, voice, and/or video signals, including multimedia signals that include voice, data, and video information. In general, network 120 can be any combination of connections and protocols that will support communications between server computing device 110, client computing device 130, and other computing devices (not shown) within data processing environment 100.

Server computing device 110 can be a standalone computing device, a management server, a web server, a mobile computing device, or any other electronic device or computing system capable of receiving, sending, and processing data. In other embodiments, server computing device 110 can represent a server computing system utilizing multiple computers as a server system, such as in a cloud computing environment. In another embodiment, server computing device 110 can be a laptop computer, a tablet computer, a netbook computer, a personal computer (PC), a desktop computer, a personal digital assistant (PDA), a smart phone, or any programmable electronic device capable of communicating with client computing device 130 and other computing devices (not shown) within data processing environment 100 via network 120. In another embodiment, server computing device 110 represents a computing system utilizing clustered computers and components (e.g., database server computers, application server computers, etc.) that act as a single pool of seamless resources when accessed within data processing environment 100. Server computing device 110 may include internal and external hardware components, as depicted, and described in further detail with respect to FIG. 4.

In various embodiments of the present invention, client computing device 130 can be one of a desktop computer, a laptop computer, a tablet computer, a smart phone, a smart wearable device, a vending machine, or any programmable electronic device capable of communicating with various components and devices within data processing environment 100, via network 120. In general, client computing device 130 represents any programmable electronic device or combination of programmable electronic devices capable of executing machine readable program instructions and communicating with other computing devices (not shown) within data processing environment 100 via a network, such as network 120.

In some embodiments, a screen of client computing device 130 is incorporated with client computing device 130. In other embodiments, a display screen can be separate from client computing device 130, connected with a network, such as network 120, or computing cables. Client computing device 130 includes shopping assist program 132. In various embodiments, shopping assist program 132 may reside on server computing device 110 in data processing environment 100, and accessible by client computing device 130 via network 120. Client computing device 130 may include internal and external hardware components, as depicted and described in further detail with respect to FIG. 4.

Shopping assist program 132 may be a mobile application software program, or a "mobile app" or an "app", designed to run on a smart phone, a tablet computer, or other mobile devices. Shopping assist program 132 may operate within a web browser, or other compatible software used for shopping displayed via client computing device 130. Shopping assist program 132 may be any native application or pre-installed software on a mobile computing device, such as client computing device 130. A native application can be, for example, a web browser, email client, mapping program, or an app for purchasing music, other media, or additional apps. Shopping assist program 132 may be a software application or a web application that can run in a mobile web browser.

Figure 2:
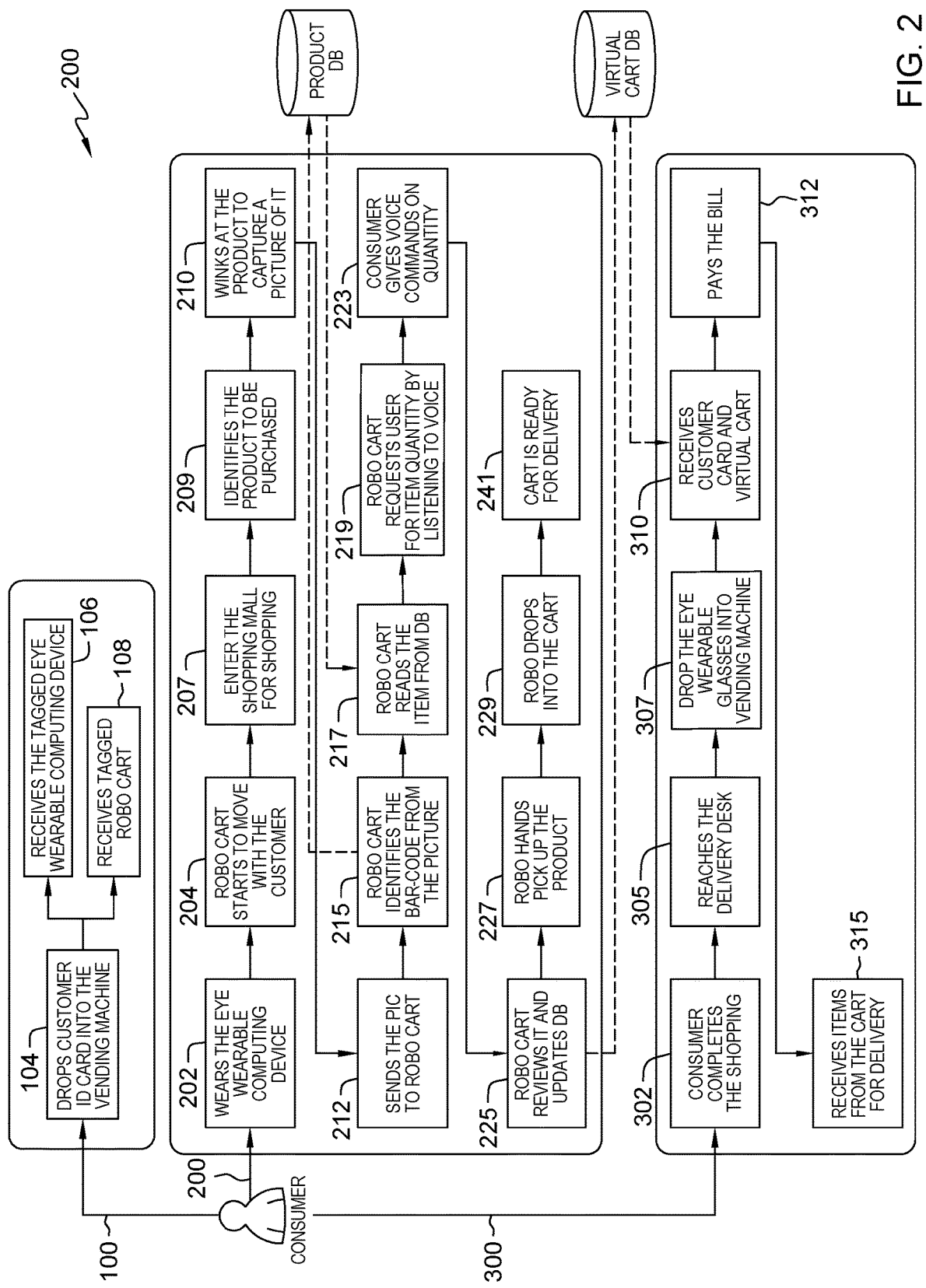
FIG. 2 is a flowchart depicting operational steps of a shopping assist program, on a server computer within the distributed data processing environment of FIG. 1, for providing virtual shopping assistance to a user, in accordance with an embodiment of the present invention.

FIG. 2 is a flowchart 200 depicting operational steps of shopping assist program 132 for providing virtual contact-less shopping assistance to a user, in accordance with an embodiment of the present invention.

Shopping assist program 132 proceeds with the following steps: Step 100 Consumer walks into the shopping area. Step 104 Drops the customer identification (ID) card of the shopping vendor into the vending machine. Step 106 Vending machine reads the customer card and tags it with the wearable computing glasses. Also delivers the device to the consumer. Step 108 Consumer also receives the customer card tagged robot cart which is also tagged with the computing device.

Shopping assist program 132 then includes step 202 Consumer wears the eye wearable computing device and starts to walk into the shopping area. Step 204 Robot cart follows the customer while the person starts the shopping. Step 207 Enter the shopping area to look for the products the consumer would want to buy. Step 209 Identifies the product the consumer wants to purchase. Step 210 Winks at the product to capture selection of the product. Step 212 Picture is sent to the robot cart, indicating selection. Step 215 robot cart analyses the picture and read the barcode from the picture. Step 217 robot cart identifies the product from the product database. Step 219 robot cart requests user for item quantity through voice commands. Step 223 Consumer gives voice command on the quantity. Step 225 robot cart reviews it and updates the virtual cart database. Step 227 robot hands picks up the quantity of the product from the shopping rack. Step 229 robot drops the picked-up products into the cart. Step 241 cart is ready for delivery after selecting all the products selected by the consumer.

Shopping assist program 132 then moves to step 300 Customer completes the shopping of all desired products using this process. Step 302 Consumer completes the shopping and ready to go for delivery. Step 305 Reaches the delivery desk. Step 307 Drop the eye wearable computing device into the vending machine. Step 310 Receives the customer card and the virtual cart information. Step 312 Consumer pays the bill. Step 315 Receives the purchased items for delivery.

In an embodiment, a computer-implemented for providing virtual contact-less shopping assistance to a user method may include one or more processors configured to execute shopping assist program 132.

In an embodiment, the computer-implemented method may include one or more processors configured for receiving customer authentication data from a user at a local device (e.g., client computing device 130) to perform a task. For example, and as described above in Step 104, the local device may include a vending machine equipped with a digital repository or digital card reader configured to detect and scan a digital card provided by the user. The digital card may be configured to be programmed with customer authentication data which may include user data (e.g., data unique to the user) and vendor data (e.g., data corresponding to the digital card issuer (e.g., shopping vendor)). Further, the local device may be configured to extract the user data from the digital card and process the user data to identify the user and associate the user with resources available to the user in the shopping area.

In an embodiment, the customer authentication data may be received by scanning a customer card (e.g., digital card) programmed with user data associated with the user. For example, the user may be issued the customer card by a shopping vendor programmed with customer authentication data comprising user data and vendor data, wherein the user may receive instructions to present the customer card to the local device for authorization to access resources available to the user at the shopping area. Once the user presents the customer card to the local device, the local device may be configured for detecting the customer card, scanning digital data stored in the customer card, and processing the digital data to determine the contents of the stored digital data. In an embodiment, the one or more processors may be configured to determined that the scanned digital data is corresponds to the customer authentication data and transmit the customer authentication data to server computing device 110 via network 120 or client computing device 130 for further processing.

In an embodiment, the local device may be configured to receive the customer card from the user and secure the customer card at the local device while the user is undergoing the shopping experience by shopping assist program 132.

In an embodiment, the computer-implemented method for providing virtual contact-less shopping assistance to a user may include one or more processors configured for determining the user is authorized to perform the task based on the customer authentication data. For example, a shopping vendor may gather and store vendor data in a vendor database in communication with network 120, wherein vendor data may be used to determine user authorization data for all users registered to the shopping vendor's service subscription. In an embodiment, the one or more processors may be configured to process the user authorization data to determine if a user is authorized to perform a task or access resources available at the shopping area. For example, if a user registers for an assisted shopping service at the shopping area under the control of the shopping vendor, then the one or more processors may be configured to determine the user's registration status based at least on the customer authentication data and the vendor data. The user's registration status may be either authorized or not authorized to access resources at the shopping area.

In an embodiment, the computer-implemented method for providing virtual contact-less shopping assistance to a user may include one or more processors configured for, responsive to determining the user is authorized, associating the customer authentication data with a tagged wearable device and a tagged mobility device with the user. For example, once the user is determined to be authorized, then the one or more processors may be configured to program resources (e.g., the tagged wearable device and the tagged mobility device) with data corresponding to the user to associate the user and corresponding customer authentication data with the resources. Once associated, the resources may be assigned to the user and be authorized for release to the user to use during the user's shopping experience.

In an embodiment, the tagged wearable device may be an augmented reality (AR) wearable smart glasses device. For example, the tagged wearable device may include AR glasses (e.g., smartglasses), smartphone AR (e.g., mobile AR), a tethered AR headset, or any other AR wearable smart device known to those of ordinary skill in the art.

In an embodiment, the tagged mobility device may be a robotic smart shopping cart comprising a robotic arm for selecting items from the shopping facility. For example, the tagged mobility device may include an autonomous shopping cart configured to self-drive and follow, lead, or navigate the shopper around a shopping area. The tagged mobility device may include a motor, powertrain, drivetrain, and wheels to traverse a surface. Further, the tagged mobility device may include one or more sensors configured to detect images, movement, sound, light, and other ambient elements within proximity of the tagged mobility device. The tagged mobility device may also include components identical to client computing device 130 configured to transmit and receive data between network 120 and other components in communication with tagged mobility device. The tagged mobility device may also include a robotic arm comprising metal segments joined by joints configured to be controlled by the one or more processors to perform tasks to assist the shopper during the shopping experience.

In an embodiment, the computer-implemented method for providing virtual contact-less shopping assistance to a user may include one or more processors configured for transmitting release instructions to the local device to release the tagged wearable device and the tagged mobility device to the user. In an embodiment, the local device may include the vending machine configured to release secured resources to a shopper upon receiving instructions to do so. Further, the local device may include the tagged wearable device and the tagged mobility device both configured to function within the confines of the shopping area or to exceed the confines of the shopping area. Nonetheless, the tagged wearable device and tagged mobility device may be secured by the vending machine that is stationary within proximity of the shopping area.

In an embodiment, secured resources may include the tagged wearable device and the tagged mobility device. For example, once the user is determined to be authorized to access the secured resources, and the secured resources are associated with the authorized user, the one or more processors may be configured to transmit release instructions data to the vending machine to release the tagged wearable device and/or the tagged mobility device to the user for use in the shopping area.

In an embodiment, the computer-implemented method for providing virtual contact-less shopping assistance to a user may include one or more processors configured for receiving a first indication that the user is wearing the tagged wearable device. In an embodiment, the tagged wearable device may include sensors configured for detecting placement on the user's face or detecting the instance when the user wears the tagged wearable device. Further, the sensors may be configured to transmit sensor data corresponding to detecting the user wearing the tagged wearable device to the tagged mobility device, the local device, or server computing device 110 via network 120. For example, once the secured resources are released to the user, the one or more processors may be configured to receive an indication that the user is wearing the tagged wearable device, wherein the indication is based at least on the sensor data corresponding to detecting the user wearing the tagged wearable device.

In an embodiment, the computer-implemented method for providing virtual contact-less shopping assistance to a user may include one or more processors configured for receiving a second indication that the user is entering a shopping facility using the tagged mobility device. In an embodiment, the local device may include sensors configured to detect and track user movement once one or more of the secured resources are released to the user. For example, the tagged mobility device and/or the tagged wearable device may include one or more sensors configured to determine a resource location and/or a user location. Further, once one or more of the resource location and the user location is determined to exceed a physical or virtual threshold corresponding to an entrance to the shopping area (e.g., shopping facility), the one or more processors may be configured to receive an indication that the user is entering the shopping facility using one or more of the tagged mobility device and the tagged wearable device.

In an embodiment, the computer-implemented method for providing virtual contact-less shopping assistance to a user may include one or more processors configured for transmitting instructions to the tagged mobility device to follow the user throughout the shopping facility. For example, the tagged mobility device may include sensors configured to detect the user and follow the user's movement to move with the user as the user moves throughout the shopping facility. Further, the tagged mobility device may be configured to receive instructions or commands from the user to perform various actions. For example, the user may instruct the tagged mobility device to stop, to follow, to wait for a specific amount of time, to presume following, to retrieve an item, or put back an item, or to perform any other task that a human shopper should be able to perform.

In an embodiment, the computer-implemented method for providing virtual contact-less shopping assistance to a user may include one or more processors configured for receiving a user instruction to capture an image causing the tagged wearable device to capture the image. In an embodiment, while the user is navigating the shopping facility wearing the tagged wearable device, the tagged wearable device may be configured to detect or receive a user input (e.g., voice command, body part gesture, typed command) via one or more components of the tagged wearable device or via one or more components of the tagged mobility device.

In an embodiment, the user input may include a command or instruction for one or more of the tagged wearable device and the tagged mobility device to perform an action (e.g., take a picture, retrieve an item). In one example embodiment, the tagged wearable device may include a sensor positioned to observe an eye of the user to determine when the user performs an eye gesture (e.g., wink) to perform a specific action corresponding to the eye gesture. For example, the tagged wearable device may detect a wink by the user which corresponds to a command for the tagged wearable device to take a picture of a product the user is focused on while wearing the tagged wearable device. In other words, a user wink may be detected by the tagged wearable device and translated to an instruction for a camera of the tagged wearable device, the instruction causing the tagged wearable device to capture the image using the camera.

In an embodiment, the computer-implemented method for providing virtual contact-less shopping assistance to a user may include one or more processors configured for identifying a bar code in the image. For example, once the image is captures, the one or more processors may be configured to process the image and determine if a bar code is in the image and identifying the bar code in the image.

In an embodiment, the computer-implemented method for providing virtual contact-less shopping assistance to a user may include one or more processors configured for determining an item based on the bar code. For example, an item may be determined based on the bar code by querying a database of bar codes and items and identifying the item that is associated with or corresponds to the bar code.

In an embodiment, the one or more processors may be configured to request a user action for the item. For example, a user action may include an item query (e.g., item description, item price, item expiration date, item calories, item nutrition information), retrieve item (e.g., use robotic arm to pick up item and place item in the cart), inspect item (e.g., use robotic arm to pick up item and rotate item to observe the item), return item (e.g., place item back on shelf or display).

In an embodiment, the computer-implemented method for providing virtual contact-less shopping assistance to a user may include one or more processors configured for generating a user prompt requesting an item quantity. For example, once an item is identified and the user submits a request to retrieve the item, the one or more processors may be configured to generate a user prompt requesting an item quantity, present the user prompt to the user, and await a response from the user. The user prompt may be presented to the user via a user interface, an audio message, or any other communication medium that the user is able to perceive.

In an embodiment, the computer-implemented method for providing virtual contact-less shopping assistance to a user may include one or more processors configured for updating a database with the item quantity. For example, if the user submits a user response to the user prompt with an item quantity, and one or more of the tagged wearable device and the tagged mobility device receives the user response, then the one or more processors may be configured to store the user response including the item quantity in a database.

In an embodiment, the computer-implemented method for providing virtual contact-less shopping assistance to a user may include one or more processors configured for transmitting an action instruction to the tagged mobility device to retrieve the item and secure the item. For example, once the item quantity is determined, the one or more processors may be configured to automatically generate and transmit an action instruction to the tagged mobility device to retrieve the item (in the quantity requested by the user) and secure the item in a cart of the tagged mobility device. Alternatively, the item may be secured by the tagged mobility device providing it directly to the user if the user is within proximity of the tagged mobility device.

In an embodiment, the computer-implemented method for providing virtual contact-less shopping assistance to a user may include one or more processors configured for receiving a third indication that the user has completed the task. For example, the tagged mobility device or the tagged wearable device may be configured to receive an indication or user input corresponding to the user completing the task. For instance, the tagged wearable device or the tagged mobility device may be configured to generate a user interface to display a user selectable icon displaying the text "complete task", or "complete shopping". Further, the tagged wearable device or the tagged mobility device may be configured to receive user input (e.g., voice utterance, text input, body gesture) corresponding to a complete task command, wherein the tagged mobility device will proceed to complete the shopping experience with the user.

In an embodiment, the computer-implemented method for providing virtual contact-less shopping assistance to a user may include one or more processors configured for receiving a fourth indication that the tagged wearable device was deposited at the local device. For example, once the user has navigated back to the local device (e.g., vending machine), the local device may be configured to receive the tagged wearable device in a repository. Upon receiving the tagged wearable device in the repository, the one or more processors may be configured to detect receipt of the tagged wearable device, wherein said detection may correspond to the indication that the tagged wearable device being deposited at the local device.

In an embodiment, the computer-implemented method for providing virtual contact-less shopping assistance to a user may include one or more processors configured for generating an invoice based at least on the item, the item quantity, and the customer authentication data. For example, once the tagged mobility device has retrieved and secured the item, the one or more processors may be configured to generate an invoice comprising the item description, quantity, price, and other pertinent information normally displayed on an invoice. The invoice may be displayed on the user interface of one or more of the tagged wearable device and the tagged mobility device or displayed on a user interface of the local device.

In an embodiment, the computer-implemented method for providing virtual contact-less shopping assistance to a user may include one or more processors configured for providing the invoice to the user. For example, one or more of the tagged mobility device and the tagged wearable device may be configured to present, display, or provide the invoice to the user via a user interface (e.g., display monitor, or other communication medium) or a peripheral printer.

In an embodiment, the computer-implemented method for providing virtual contact-less shopping assistance to a user may include one or more processors configured for processing payment information received from the user. For example, one or more of the tagged mobility device and the tagged wearable device may include a chip reader or payment processing software to receive user authorization to process user payment information for the invoice presented to the user.

In an embodiment, the computer-implemented method for providing virtual contact-less shopping assistance to a user may include one or more processors configured for receiving the tagged wearable device and the tagged mobility device from the user at the local device. For example, upon receiving an indication that the user has completed the shopping experience, the local device may be configured to receive and secure the tagged wearable device and the tagged mobility device from the user.

In an embodiment, the computer-implemented method for providing virtual contact-less shopping assistance to a user may include one or more processors configured for releasing the customer card to the user upon receiving confirmation that local device has received and secured the tagged wearable device and the tagged mobility device from the user.

In an embodiment, the computer-implemented method for providing virtual contact-less shopping assistance to a user may include one or more processors configured for delivering the items in the tagged mobility device to a delivery station in preparation for the user to pick up at the end of the shopping experience. For example, upon receiving the indication that the user has completed the task (e.g., assisted shopping), the one or more processors may be configured to send instructions to the tagged mobility device to transport the items in a cart of the tagged mobility device to the delivery station and provide the items or make the items available to the user upon receiving confirmation that the payment information was received from the user and the invoice was satisfied.

The present invention may contain various accessible data sources, such as databases, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Shopping assist program 132 enables the authorized and secure processing of personal data. Shopping assist program 132 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Shopping assist program 132 provides information regarding personal data and the nature (e.g., type, scope, purpose, duration, etc.) of the processing. Shopping assist program 132 provides the user with copies of stored personal data. Shopping assist program 132 allows the correction or completion of incorrect or incomplete personal data. Shopping assist program 132 allows the immediate deletion of personal data.

Figure 3:
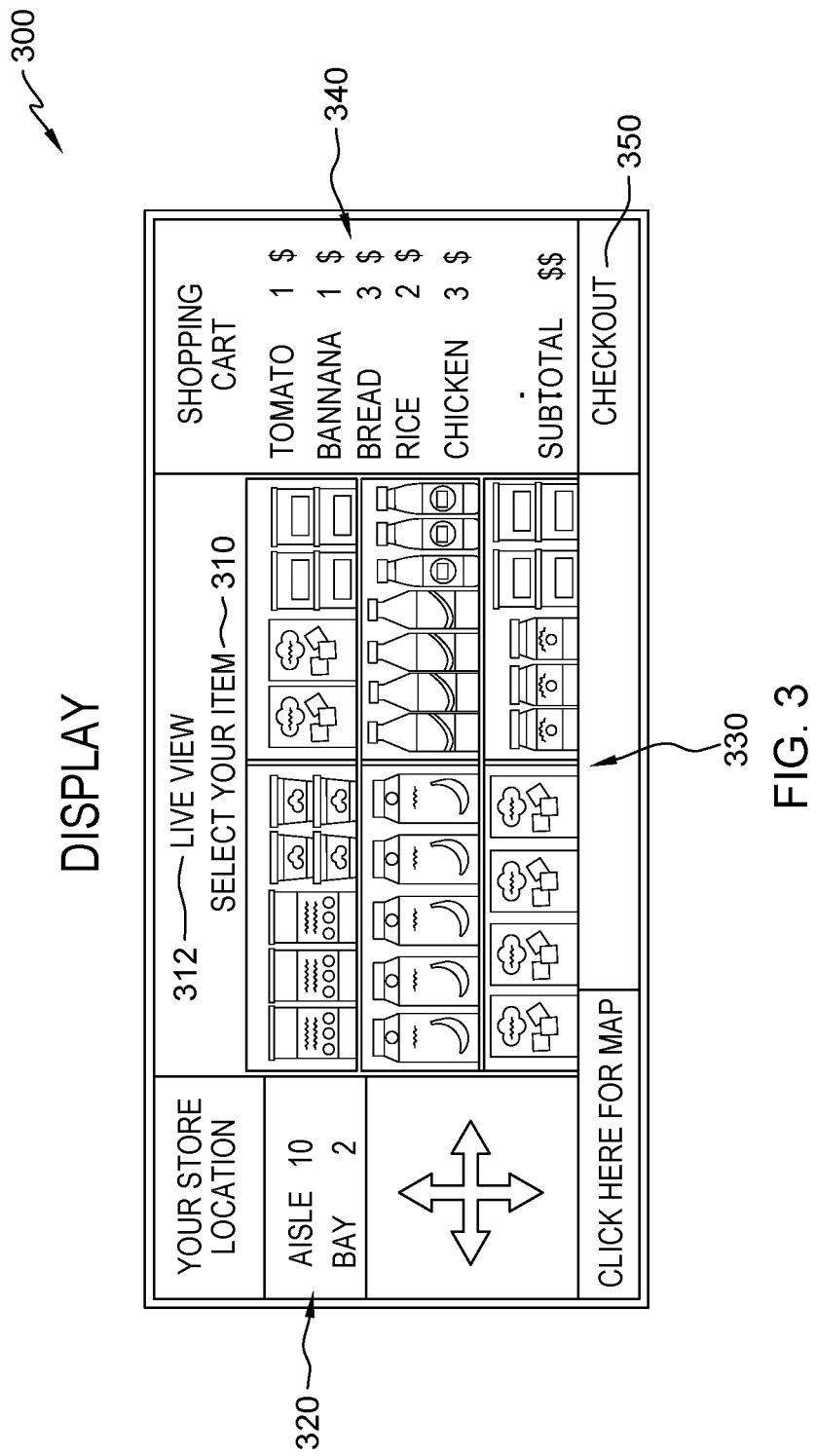
FIG. 3 illustrates an example display of a user utilizing the shopping assist program, in accordance with an embodiment of the present invention.

FIG. 3 illustrates an example display 300 for a user utilizing the shopping assist program, in accordance with an embodiment of the present invention.

In an embodiment, display 300 may include layout 310 of the shopping facility comprising view description 312 (e.g., live view), navigational bar 320, user selectable items 330, shopping cart display 340, and checkout tab 350 arranged within layout 310 of display 300.

In an embodiment, view description 312 may include text describing the view of layout 310, wherein the view may be a live view, a past view or a view that is customizable for or by the user.

In an embodiment, navigational bar 320 may include a description of the store location corresponding to a location of the shopping facility selected by or presented to the user. Further, navigational bar 320 may include a more precise location of an item in the shopping facility or a more precise location of the user within the shopping facility. For example, the more precise location of an item or the user may be aisle 10, bay 2. Navigational bar 320 may also include a navigational compass to assist the shopper with virtually navigating throughout the shopping facility to locate items or explore items within the shopping facility. Furthermore, navigational bar 320 may include a map user selectable icon (e.g., "CLICK HERE FOR MAP") to access a map and display the map within at least a portion of display 300.

In an embodiment, user selectable items 330 may include one or more images or text descriptions of items either available or unavailable for purchase in the shopping facility. For example, user selectable items 300 may include images or text descriptions of fruits and vegetables, produce, frozen goods, toiletries, or any other category of goods or services available or not available for sale in the shopping facility.

In an embodiment, shopping cart display 340 may include a list and description of the items selected and secured by the tagged mobility device. For example, if the tagged mobility device received an instruction to select a tomato, a banana, 3 loaves of bread, 2 bags of rice and 3 pieces of chicken, then shopping cart display 340 may include text descriptions of the items selected and secured along with a quantity and other information (e.g., price, nutritional values) describing the items.

In an embodiment, checkout tab 350 may be included in layout 310 of display 300, wherein checkout tab 350 may be a user selectable icon configured to provide an indication that the user has completed the task (e.g., shopping).

Figure 4:
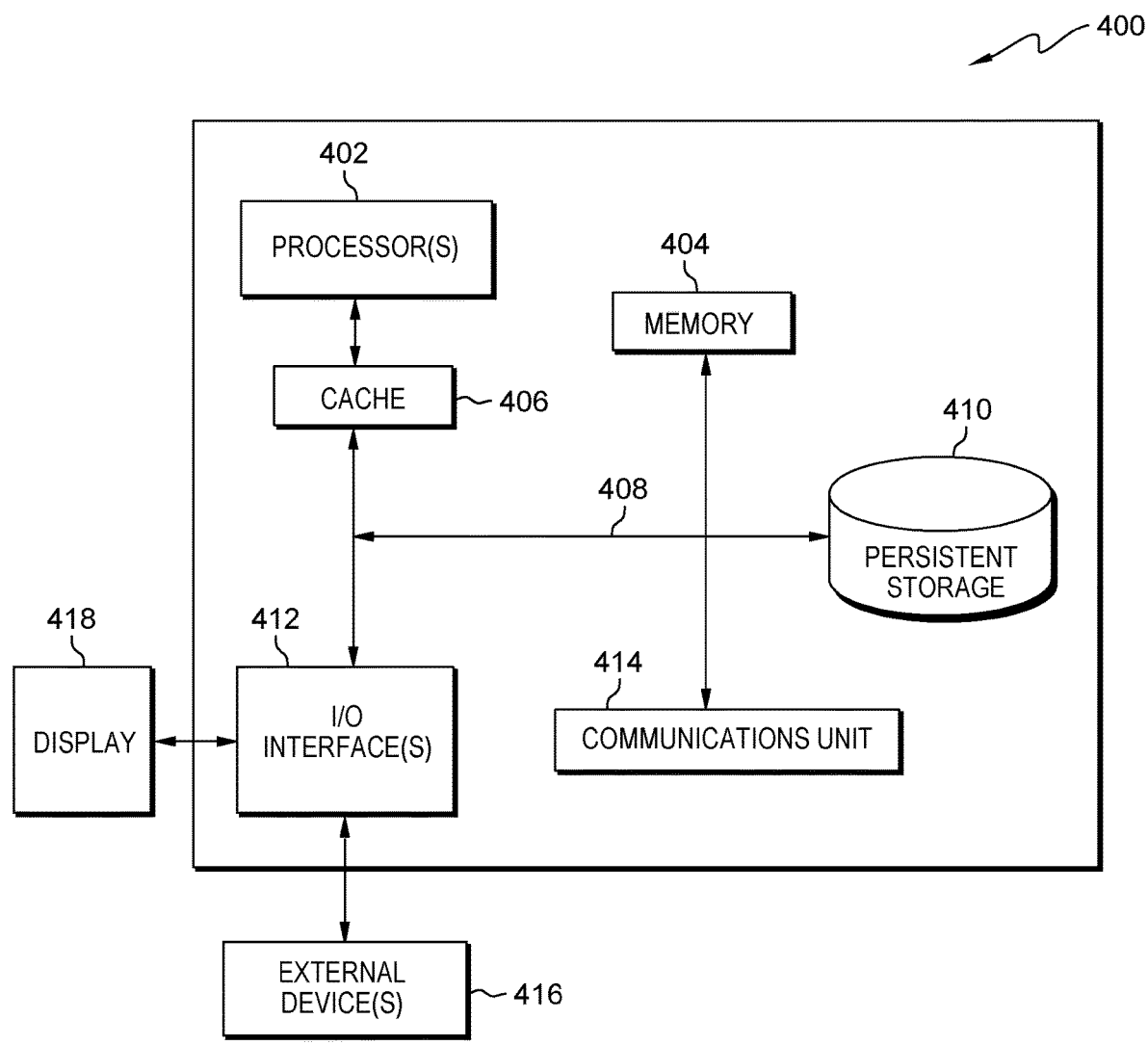
FIG. 4 depicts a block diagram of components of the server computer executing the shopping assist program within the distributed data processing environment of FIG. 1, in accordance with an embodiment of the present invention.

FIG. 4 depicts a block diagram 400 of components of server computing device 110 or client computing device 130 within data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computing device 110 or client computing device 130 can include processor(s) 402, memory 404, cache 406, persistent storage 410, input/output (I/O) interface(s) 412, communications unit 414, and communications fabric 408. Communications fabric 408 provides communications between memory 404, cache 406, persistent storage 410, communications unit 414, and input/output (I/O) interface(s) 412. Communications fabric 408 can be implemented with any architecture designed for passing data and/or control information between processors (such as microprocessors, communications and network processors, etc.), system memory, peripheral devices, and any other hardware components within a system. For example, communications fabric 408 can be implemented with one or more buses.

Memory 404 and persistent storage 410 are computer readable storage media. In this embodiment, memory 404 includes random access memory (RAM). In general, memory 404 can include any suitable volatile or non-volatile computer readable storage media. Cache 406 is a fast memory that enhances the performance of processor(s) 402 by holding recently accessed data, and data near recently accessed data, from memory 404.

Program instructions and data used to practice embodiments of the present invention, such as shopping assist program 132, can be stored in persistent storage 410 for execution and/or access by one or more of the respective processor(s) 402 of client computing device 130 via cache 406. In this embodiment, persistent storage 410 includes a magnetic hard disk drive. Alternatively, or in addition to a magnetic hard disk drive, persistent storage 410 can include a solid-state hard drive, a semiconductor storage device, a read-only memory (ROM), an erasable programmable read-only memory (EPROM), a flash memory, or any other computer readable storage media or device that is capable of storing program instructions or digital information.

The media used by persistent storage 410 may also be removable. For example, a removable hard drive may be used for persistent storage 410. Other examples include optical and magnetic disks, thumb drives, and smart cards that are inserted into a drive for transfer onto another computer readable storage medium that is also part of persistent storage 410.

Communications unit 414, in these examples, provides for communications with other data processing systems or devices, including resources of server computing device 110 or client computing device 130. In these examples, communications unit 414 includes one or more network interface cards. Communications unit 414 may provide communications through the use of either or both physical and wireless communications links. Software and data used to practice embodiments of the present invention, for example, digital text program 132, may be downloaded to persistent storage 410 through communications unit 414.

I/O interface(s) 412 allows for input and output of data with other devices that may be connected to server computing device 110 or client computing device 130. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention can be stored on such portable computer readable storage media and can be loaded onto persistent storage 410 via I/O interface(s) 412. I/O interface(s) 412 also connect to a display 418.

Display 418 provides a mechanism to display data to a user and may be, for example, a computer monitor or an incorporated display screen, such as is used, for example, in tablet computers and smart phones.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
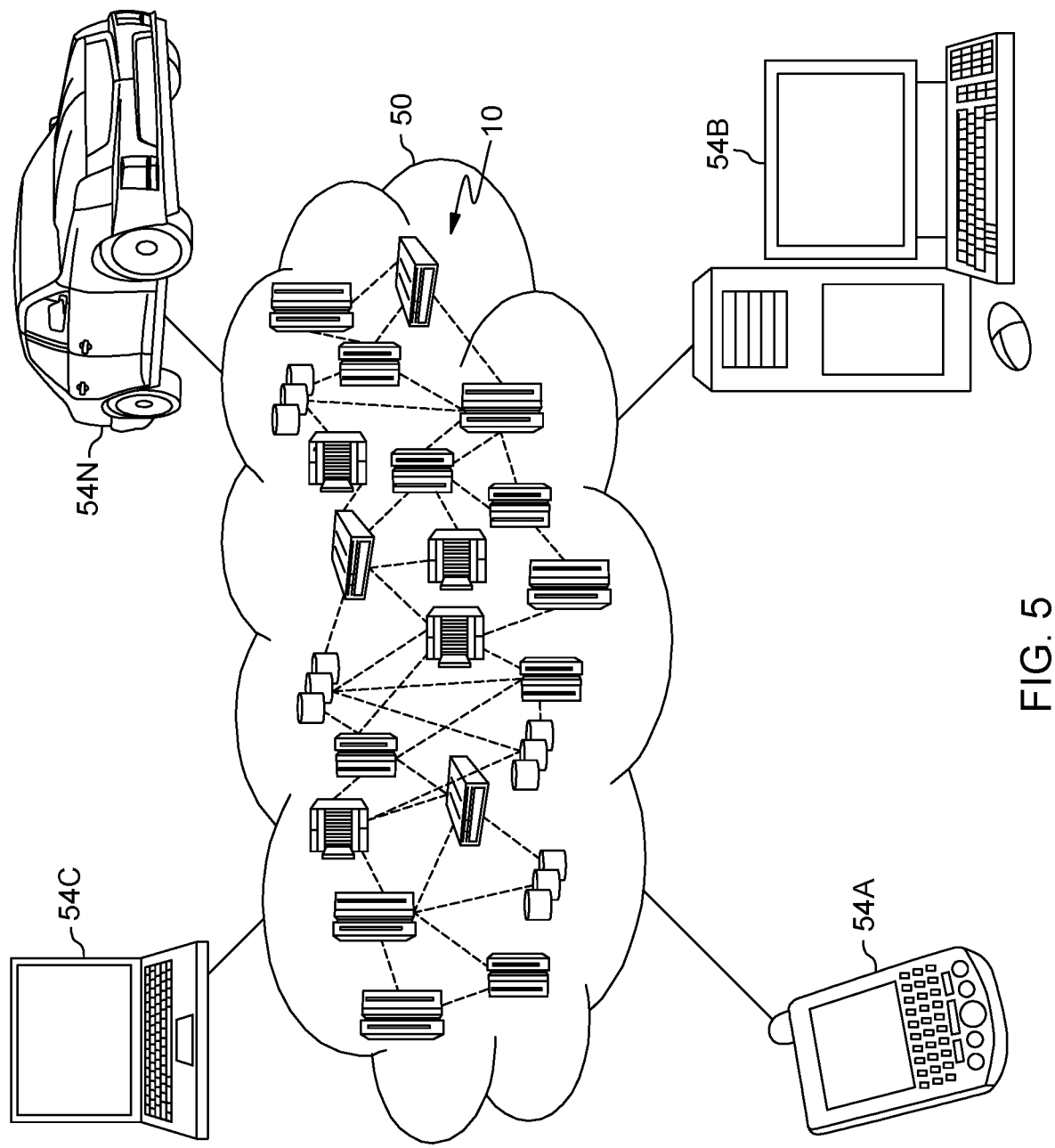
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 50 can communicate with any type of computerized device over any type of network and/or network addressable connection (e.g., using a web browser). In various embodiments, cloud computing node 10 is a computer system including components and capabilities as discussed with respect to FIG. 4.

Figure 6:
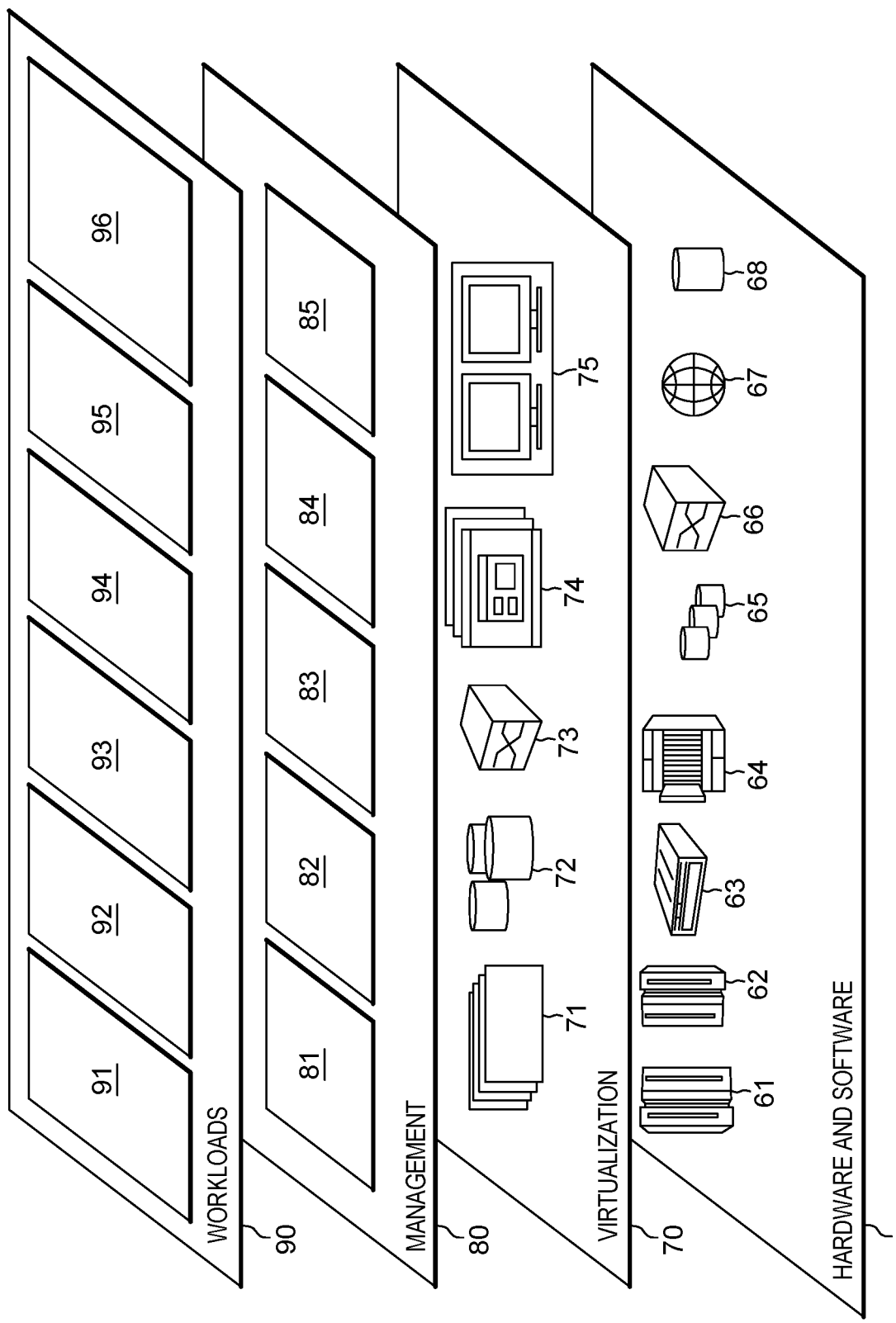
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and shopping assist program 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a computer-implemented method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
 receiving, by one or more processors, customer authentication data from a user at a local device to perform a task;
 determining, by one or more processors, the user is authorized to perform the task based on the customer authentication data;
 responsive to determining the user is authorized, associating, by the one or more processors, the customer authentication data with a tagged wearable device and a tagged mobility device with the user;

transmitting, by one or more processors, release instructions to the local device to release the tagged wearable device and the tagged mobility device to the user;

receiving, by one or more processors, a first indication that the user is wearing the tagged wearable device;

receiving, by one or more processors, a second indication that the user is entering a shopping facility using the tagged mobility device;

receiving, by one or more processors, a user instruction to capture an image causing the tagged wearable device to capture the image;

identifying, by one or more processors, a bar code in the image;

determining, by one or more processors, an item based on the bar code;

generating, by one or more processors, a user prompt requesting an item quantity;

updating, by one or more processors, a database with the item quantity;

transmitting, by one or more processors, an action instruction to the tagged mobility device to retrieve the item and secure the item; and receiving, by one or more processors, a third indication that the user has completed the task.

2. The computer-implemented method of claim 1, further comprising:

receiving, by the one or more processors, a fourth indication that the tagged wearable device was deposited at the local device.

3. The computer-implemented method of claim 1, further comprising:

generating, by one or more processors, an invoice based at least on the item, the item quantity, and the customer authentication data;

providing, by one or more processors, the invoice to the user; and processing, by one or more processors, payment information received from the user.

4. The computer-implemented method of claim 1, wherein the customer authentication data is received by scanning a customer card programmed with user data associated with the user.

5. The computer-implemented method of claim 1, wherein the tagged wearable device is an augmented reality (AR) wearable smart glasses device.

6. The computer-implemented method of claim 1, wherein the tagged mobility device is a robotic smart shopping cart comprising a robotic arm for selecting items from the shopping facility.

7. The computer-implemented method of claim 1, further comprising:

responsive to receiving the third indication that the user has completed the task, delivering, by one or more processors, the item to the user.

8. A computer program product, the computer program product comprising:

one or more computer readable storage media and program instructions collectively stored on the one or more computer readable storage media, the stored program instructions comprising program instructions to perform a computer-implemented method comprising:

receiving customer authentication data from a user at a local device to perform a task;

determining the user is authorized to perform the task based on the customer authentication data;

responsive to determining the user is authorized, associating the customer authentication data with a tagged wearable device and a tagged mobility device with the user;

transmitting release instructions to the local device to release the tagged wearable device and the tagged mobility device to the user;

receiving a first indication that the user is wearing the tagged wearable device;

receiving a second indication that the user is entering a shopping facility using the tagged mobility device;

receiving a user instruction to capture an image causing the tagged wearable device to capture the image;

identifying a bar code in the image;

determining an item based on the bar code;

generating a user prompt requesting an item quantity;

updating a database with the item quantity;

transmitting an action instruction to the tagged mobility device to retrieve the item and secure the item; and receiving a third indication that the user has completed the task.

9. The computer program product of claim 8, further comprising:

receiving a fourth indication that the tagged wearable device was deposited at the local device.

10. The computer program product of claim 8, further comprising:

generating an invoice based at least on the item, the item quantity, and the customer authentication data;

providing the invoice to the user; and processing payment information received from the user.

11. The computer program product of claim 8, wherein the customer authentication data is received by scanning a customer card programmed with user data associated with the user.

12. The computer program product of claim 8, wherein the tagged wearable device is an augmented reality (AR) wearable smart glasses device.

13. The computer program product of claim 8, wherein the tagged mobility device is a robotic smart shopping cart comprising a robotic arm for selecting items from the shopping facility.

14. The computer program product of claim 8, further comprising:

responsive to receiving the third indication that the user has completed the task, delivering the item to the user.

15. A computer system, the computer system comprising:

one or more computer processors;

one or more computer readable storage media;

program instructions collectively stored on the one or more computer readable storage media for execution by at least one of the one or more computer processors, the stored program instructions comprising program instructions to perform a computer-implemented method comprising:

receiving customer authentication data from a user at a local device to perform a task;

determining the user is authorized to perform the task based on the customer authentication data;

responsive to determining the user is authorized, associating the customer authentication data with a tagged wearable device and a tagged mobility device with the user;

transmitting release instructions to the local device to release the tagged wearable device and the tagged mobility device to the user;

receiving a first indication that the user is wearing the tagged wearable device;
receiving a second indication that the user is entering a shopping facility using the tagged mobility device;
receiving a user instruction to capture an image causing the tagged wearable device to capture the image;
identifying a bar code in the image;
determining an item based on the bar code;
generating a user prompt requesting an item quantity;
updating a database with the item quantity;
transmitting an action instruction to the tagged mobility device to retrieve the item and secure the item; and
receiving a third indication that the user has completed the task.

16. The computer system of claim 15, further comprising:
receiving a fourth indication that the tagged wearable device was deposited at the local device.

17. The computer system of claim 15, further comprising:
generating an invoice based at least on the item, the item quantity, and the customer authentication data;
providing the invoice to the user; and
processing payment information received from the user.

18. The computer system of claim 15, wherein the customer authentication data is received by scanning a customer card programmed with user data associated with the user.

19. The computer system of claim 15, wherein the tagged wearable device is an augmented reality (AR) wearable smart glasses device.

20. The computer system of claim 15, further comprising:
responsive to receiving the third indication that the user has completed the task, delivering the item to the user, wherein the tagged mobility device is a robotic smart shopping cart comprising a robotic arm for selecting items from the shopping facility.

* * * * *